Patented Aug. 31, 1954

2,688,030

UNITED STATES PATENT OFFICE 2,688,030

14-HYDROXYEQUILENIN AND DERIVATIVES

Neal L. McNiven, Shrewsbury, Mass., assignor to G. D. Searle & Co., Chicago, Ill., a corporation of Illinois No Drawing. Application May 11, 1953, Serial No. 354,404

3 Claims. (Cl. 260—397.45)

This invention relates to oxidation products of equilenin and to processes for the preparation thereof. In particular, this invention relates to hydroxy derivatives of equilenin having the formula

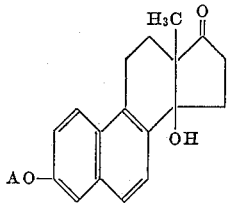

wherein A is selected from the group consisting of hydrogen, and lower alkyl and lower alkanoyl radicals. Lower alkyl and lower alkanoyl radicals are defined as those containing not more than 4 carbon atoms, and include methyl, ethyl, propyl, isopropyl, butyl, isobutyl, secondary butyl, formyl, acetyl, propionyl, butyryl, and isobutyryl radicals.

The compounds of this invention are useful chemotherapeutic materials in the field of cardiac pathology. In particular, they are valuable because of their digitalis-like activity, showing marked capacity for myocardial stimulation in instances of insufficiency associated with the failing heart.

The subject compounds are soluble in aqueous solutions of alcohols and other water-miscible organic solvents. They may be administered in solid form as tablets or capsules; dissolved in aqueous media, they may be given parenterially.

The compounds to which this invention relates may be conveniently prepared according to the following procedure: An equilenin derivative—wherein protection of the hydroxyl at $C_3$ (and other substituent hydroxyls, if any) has been effected by esterification, etherification or the equivalent—is subjected to the action of an oxidizing agent such as chromic anhydride in aqueous acetic acid, tertiary butyl chromate, chromic oxide in glacial acetic acid, chromyl chloride in carbon tetrachloride, potassium permanganate in aqueous acetic acid, and the like; and the neutral oxidation products thereby obtained are chromatographed to give the desired hydroxy and hydroxyoxo equilenin ester or ether. The reaction is ordinarily run at moderate temperatures ranging from 10 to 55° centigrade for periods of time varying between 15 minutes and 4 hours. The 3-hydroxy derivatives may be conveniently prepared from the corresponding 3-esters by conventional hydrolytic techniques—as, for example, by saponification in aqueous alcoholic medium with a basic reagent such as potash, caustic soda, potassium carbonate, or the like.

Among the compounds of the preesnt invention which may be obtained by the foregoing procedure are 14-hydroxyequilenin acetate, having the formula

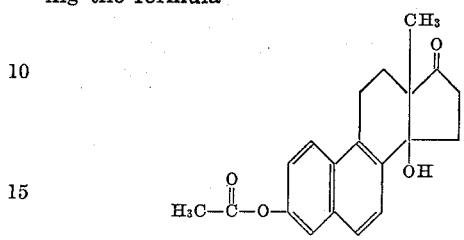

14-hydroxyequilenin methyl ether, having the formula

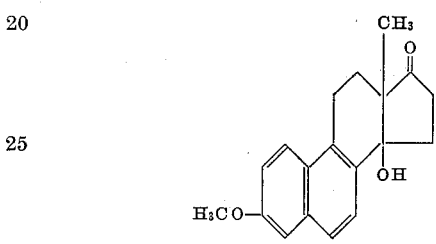

and 14-hydroxyequilenin, having the formula

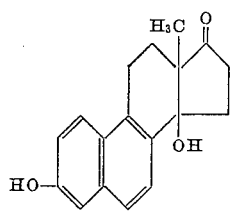

The following examples will illustrate in detail certain of the compounds comprehended by the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), and relative amounts of materials in milligrams (mg.), grams (gm.), milliliters (ml.) or liters (l.), except as otherwise noted. Specific rotations refer to chloroform solutions.

Example 1

To a solution of 4 gm. of d-equilenin acetate (derived from natural equilenin or by resolution and subsequent acetylation of d,l-equilenin) in 750 ml. of glacial acetic acid is added, with stirring at 20° C., a solution of 2.6 gm. chromic anhydride in 7.85 ml. water and 32 ml. glacial acetic acid. The reaction mixture is maintained at 20° C. for 1 hour with continued stirring, then poured into 2 l. of water and extracted with 10 50-ml. portions of methylene chloride. The combined extracts are washed with 5 135-ml. portions of a solution consisting of 24 ml. of saturated aqueous sodium carbonate, 34 ml. of saturated aqueous sodium bicarbonate, and 77 ml. of water, then dried over anhydrous sodium sulfate. The solvent is next removed by vacuum distillation at a maximum bath temperature of 55° C., leaving a gummy residue which contains the neutral oxidation products. The residue is taken up in 200 ml. of benzene, and this solution is chromatographed on 110 gm. of 100–200 mesh silica gel. The adsorbed material is eluted successively with 50-ml. portions of mixtures of benzene and ethyl acetate containing gradually increasing amounts of ethyl acetate. Following evaporation of these eluates to dryness, the individual weights of residues thus obtained are plotted against the cumulative eluate volume. Three peaks result.

A. *Recovery of starting material.*—Material represented by the first peak is unchanged d-equilenin acetate.

B. *14 - hydroxyequilenin acetate.* — Material represented by that portion of the second peak lying to the right of a line drawn perpendicularly through its summit is crystalized from methyl alcohol to give a product, M. P. 178–179.5° C., $[\alpha]_D^{23} + 105°$, the infrared absorption spectrum of which contains the characteristic bands of an alcoholic hydroxyl group. The product is 14-hydroxyequilenin acetate.

C. *Hydroxy-11-oxoequilenin acetate.*—Material represented by the third peak of the chromatogram of the oxidation products of d-equilenin acetate is crystallized from methyl alcohol to give a substance, M. P. 235–237° C., $[\alpha]_D^{24} + 288°$. Infrared absorption spectra display the characteristic bands of a conjugated keto group and of an alcoholic hydroxyl group. This material is hydroxy-11-oxo-equilenin acetate.

Example 2

*d,l-14-hydroxyequilenin methyl ether.*—A 680 mg. sample of d,l-equilenin methyl ether, oxidized according to the procedure of Example 1 using chromic anhydride in aqueous acetic acid solution, and chromatographed on silica gel as before, gives a characteristic 3-peak chromatogram. Material represented by the latter half of the second peak—upon treatment in methyl alcohol solution with decolorizing charcoal, and crystallization of this alcoholic solution—gives d,l-14-hydroxyequilenin methyl ether, M. P. 164–165.5° C. The infrared absorption spectrum contains the characteristic band of an alcoholic hydroxyl group.

I claim:

1. Hydroxy derivatives of equilenin having the formula

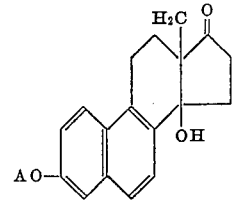

wherein A is selected from the group consisting of hydrogen, lower alkyl and lower alkanoyl radicals.

2. 14-hydroxyequilenin acetate.
3. 14-hydroxyequilenin methyl ether.

No references cited.